United States Patent
Abramson

(10) Patent No.: US 8,112,369 B2
(45) Date of Patent: Feb. 7, 2012

(54) METHODS AND SYSTEMS OF ADAPTIVE COALITION OF COGNITIVE AGENTS

(75) Inventor: Myriam Zana Abramson, Arlington, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 612 days.

(21) Appl. No.: 12/369,162

(22) Filed: Feb. 11, 2009

(65) Prior Publication Data

US 2010/0205122 A1    Aug. 12, 2010

(51) Int. Cl.
*G06F 15/18* (2006.01)
*G06N 5/04* (2006.01)

(52) U.S. Cl. .......................................... 706/12; 706/16
(58) Field of Classification Search .................... 706/12, 706/16; 705/7.36
See application file for complete search history.

(56) References Cited

U.S. PATENT DOCUMENTS

| 6,249,768 B1 * | 6/2001 | Tulskie et al. ............... 705/7.36 |
| 2006/0195408 A1 * | 8/2006 | Siler ................. 706/16 |

OTHER PUBLICATIONS

Myriam Abramson; Coalition Formation of Cognitive Agents; ICCCD Conference: Sep. 15, 2008; pp. 1-8 (including cover sheet); Published in the USA.

* cited by examiner

*Primary Examiner* — Jeffrey A Gaffin
*Assistant Examiner* — Ola Olude Afolabi
(74) *Attorney, Agent, or Firm* — Amy L. Ressing; John Leonard Young

(57) ABSTRACT

Coalitions from interactions and adaptations of cognitive map agents are evolved using an algorithm. A population of agents are seeded with cognitive map variants characterizing different cultures or different affiliations. The algorithm evolves this population by modifying the cognitive maps using a modified Particle Swarm Optimization algorithm. The modifications include modification to weights of the cognitive map, and the structure of the cognitive map of the global best (gbest) in the neighborhood is imitated according to a weighted random selection, based on the commonality of the node characteristic in the neighborhood. The end results indicate whether a coalition is possible and what cognitive maps emerge. These results are visualized on a 2D grid and measured with a clustering metric.

17 Claims, 15 Drawing Sheets

METHODS AND SYSTEMS OF ADAPTIVE COALITION OF COGNITIVE AGENTS

FIELD OF THE INVENTION

The present invention relates to artificial intelligence and cognitive modeling technologies related to computerized network interactions using knowledge base systems, also known as expert systems. More particularly, the present invention applies to learning algorithms for determining psychological tactics, in regard to modeling interactions of agents/actors from different cultures and predicting the viability of alliance formation and predicting non alliance formation with groups having different cultures.

BACKGROUND OF THE INVENTION

Knowledge base systems include numerous approaches to knowledge representation and manipulation including: ruled based systems, which capture knowledge in the form of structured if-then statements, model based reasoning using software models to capture knowledge or to emulate real processes; neural networks comprising a network of nodes and connections (i.e., neural nets) for capturing knowledge, i.e., the neural nets can learn by using examples; thus, neural networks can be considered a type of artificial intelligence technology that imitates the way a human brain works; fuzzy logic for representing and manipulating knowledge which is incomplete or imprecise; and decision tree implementations which capture decision making that can be expressed as sets of ordered decisions. Fuzzy logic is sometimes combined with other knowledge based technologies.

Artificial intelligence and cognitive modeling involve simulating properties of neural networks, where artificial intelligence technologies solve particular tasks and where cognitive modeling includes building mathematical models of neural systems. Thus, cognitive modeling includes physical and/or mathematical modeling of neural systems behavior.

Generally, cognitive maps are graphical models and/or graphical representations of perceived cause-and-effect (i.e., causal assertions, showing feedback loops) of relationships between concepts, events, and/or actions expressed as directed edges between nodes as illustrated in FIG. 5, which illustrates the cultural belief that working hard will lead to success. These cognitive maps in the form of graphical models differ from other graphical representations for problem solving, such as Bayesian belief nets and influence diagrams, because feedback loops, i.e., cycles, are possible in cognitive maps, where such cycles are not possible in Bayesian belief nets and influence diagrams. Cognitive maps are suited to represent complex models of interactions that evolve with time. Positive or negative causality are specified on the edges to indicate whether an increased strength in a causal node effects an increased or decreased strength in a related node. Fuzzy cognitive maps further expand this representation by assigning a value to the edges in the fuzzy causal range [−1,1] and a value to the nodes in the fuzzy range [0,1].

In some learning paradigms, learning algorithms may fall within the realm of estimation problems, such as statistical modeling, compression, filtering, blind source separation and clustering. There are numerous algorithms available for training neural network models and these algorithms can be characterized as optimization and statistical estimation algorithms. A statistical estimator can be an arbitrary neural model and/or a neural network and/or a neuro-fuzzy model trained by known training methods and pruning methods. In exemplary embodiments, a novel learning algorithm is implemented to train a neural network as a statistical estimator to determine activity parameters.

A Particle Swarm Optimization (PSO) algorithm, based on a cultural learning metaphor, where an agent, represented as an n-dimensional feature vector, adapts its solution in a problem space from its social interactions. A search through the problem space is controlled by an n-dimensional velocity vector giving the learning agent a particle movement characteristic. Two types of interactions are usually distinguished: (1) a top-down type of interaction based on normative knowledge of a global best (also referred to herein as "gbest") and (2) a bottom-up type of interaction based on internal and neighborhood knowledge of a local best (also referred to herein as "lbest"). Additionally, lbest acts as the agent's episodic memory of past performances. The cognitive and social influences are modulated by the stochastic parameters $\phi_1$ and $\phi_2$ (lower case Phi 1 and Phi 2), respectively. An inertia parameter omega ($\omega$), decreasing with time, acts as the momentum in the neural networks in controlling the exploration-exploitation tradeoff of the search.

A PSO algorithm implements a stochastic search algorithm similar to genetic algorithms but with a social cognitive metaphor. A PSO algorithm emphasizes reinforcement through imitation instead of reproduction. PSO algorithm particle representation is in real number points in the search space. In a basic PSO algorithm, each particle has a magnitude x and a velocity v; where $p^l$ and $p^g$ are the local best (lbest) and global best (gbest) for a given particle; where $c_1$ and $c_2$ are the cognitive and social parameters; where $r_1$ and $r_2$ are random numbers [0,1] and at each time step:

$$v(t+1)=v(t)+c_1 r_1(p^l(t)-x(t))+c_2 r_2(p^g(t)-x(t)) \quad \text{formula (1); and}$$

$$x(t+1)=x(t)+v(t+1) \quad \text{formula (2).}$$

The velocities (v) are bounded to a value±vmax to control the search. As agents interact, subsets of the population become more similar and successful together or more dissimilar.

According to exemplary embodiments herein, practical applications in psychological warfare tactics, in regard to modeling interactions of agents/actors from different cultures and predicting the viability of war time alliance formation and predicting non alliance formation with groups having different cultures are described. For example, the impact of a foreign presence in a multiethnic society can be modeled, using adaptive algorithms for coalition of cognitive agents.

Therefore, the need exists for a computer implemented method and system of predicting alliance formation among groups, by determining beliefs of a plurality of agents and/or partners.

Further, the need exists for a computer implemented method and system of predicting alliance formation by inferencing a plurality of fuzzy cognitive maps on a linear combination of a plurality of cognitive maps among groups of agents and/or partners.

The need exists for a cognitive map, where feedback loops, i.e., cycles are possible.

The need exists for a cognitive map of an agent that consists of concept nodes and/or utility nodes representing the desirable and/or undesirable goal states, and policy nodes that represent the possible actions of the agent.

The need exists for a computer implemented method and system of predicting alliance formation by adapting a belief system represented by the linear combination of cognitive maps, in response to a social environment represented by a belief system among groups of people.

Furthermore, the need exists for a computer implemented method and system for predicting alliance formation by forming teams and/or coalitions based on inferencing and modifying beliefs, by learning mental properties through experience over time, to achieve mutual beliefs among groups of people.

SUMMARY OF THE INVENTION

A method and system including instructions implemented in a computer readable and computer executable program on a computer processor are described herein, which operate together in predicting alliance formation among groups, by determining and/or describing (general) beliefs of a plurality of agents.

The method and/or system comprising receiving, by the computer processor, a request made by a user and/or operator for predicting alliance formation among disparate groups is described in terms of exemplary embodiments herein. Upon receipt of the request, the method and system operate together by initiating a learning algorithm, thus causing the computer processor to execute the computer readable and executable program of predicting alliance formation among designated disparate groups of people. The method and system further operate in combination by inferencing a plurality of fuzzy cognitive maps on a linear combination of a plurality of cognitive maps of a first group of agents from the plurality of agents, wherein the plurality of agents include cognitive agents.

The first group of agents interact with a second group of agents from the plurality of agents; and where one or more agents from the first and second groups of agents represent partner preferences.

The method and system further operate together to cause adapting, by the first group of agents, a belief system represented by the linear combination of cognitive maps, in response to a social environment represented by a belief system attributed to the second group of agents who were interacted with, by the first group of agents.

The method and system continue to operate in combination forming a team and/or coalition including the first group of agents and the second group of agents, based on inferencing and modifying beliefs, by learning mental properties through experience (over time), to achieve mutual (consonant and/or complementary) beliefs among the first group of agents and the second group of agents, using a learning algorithm, and generating, by the computer processor, a proposal result predicting alliance formation among the first group of agents and the second group of agents.

DETAILED DESCRIPTION

Figure 1A:
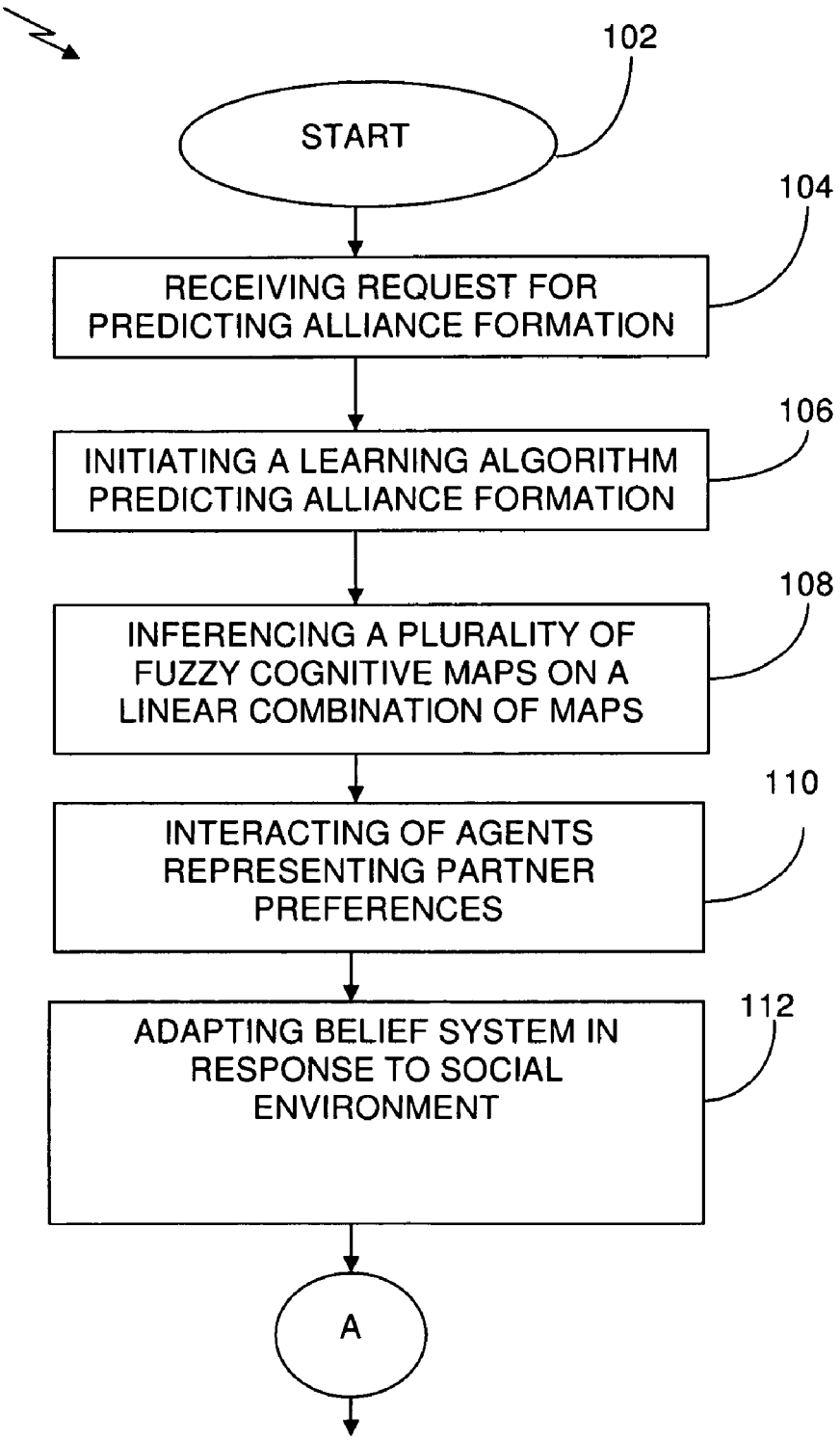
FIG. 1A illustrates elements of a method of predicting alliance formation among groups.

Preferred exemplary embodiments of the present invention are now described with reference to the figures, in which like reference numerals are generally used to indicate identical or functionally similar elements. While specific details of the preferred exemplary embodiments are discussed, it should be understood that this is done for illustrative purposes only. A person skilled in the relevant art will recognize that other configurations and arrangements can be used without departing from the spirit and scope of the preferred exemplary embodiments. It will also be apparent to a person skilled in the relevant art that the exemplary embodiments can also be employed in other applications. Further, the terms "a", "an", "first", "second" and "third" etc. used herein do not denote limitations of quantity, but rather denote the presence of one or more of the referenced items(s).

A method, system and program product including instructions implemented in a computer readable and computer executable program on a computer processor are described herein as predicting alliance formation among groups of people, by determining and/or describing general beliefs of a plurality of agents. Exemplary embodiments address the following key issues: (1) which alliances will be formed; (2) which alliances will be broken; (3) what is the nature of those alliances; and (4) can the method and system influence a desired outcome, as to which alliances will be formed?

Figure 1B:
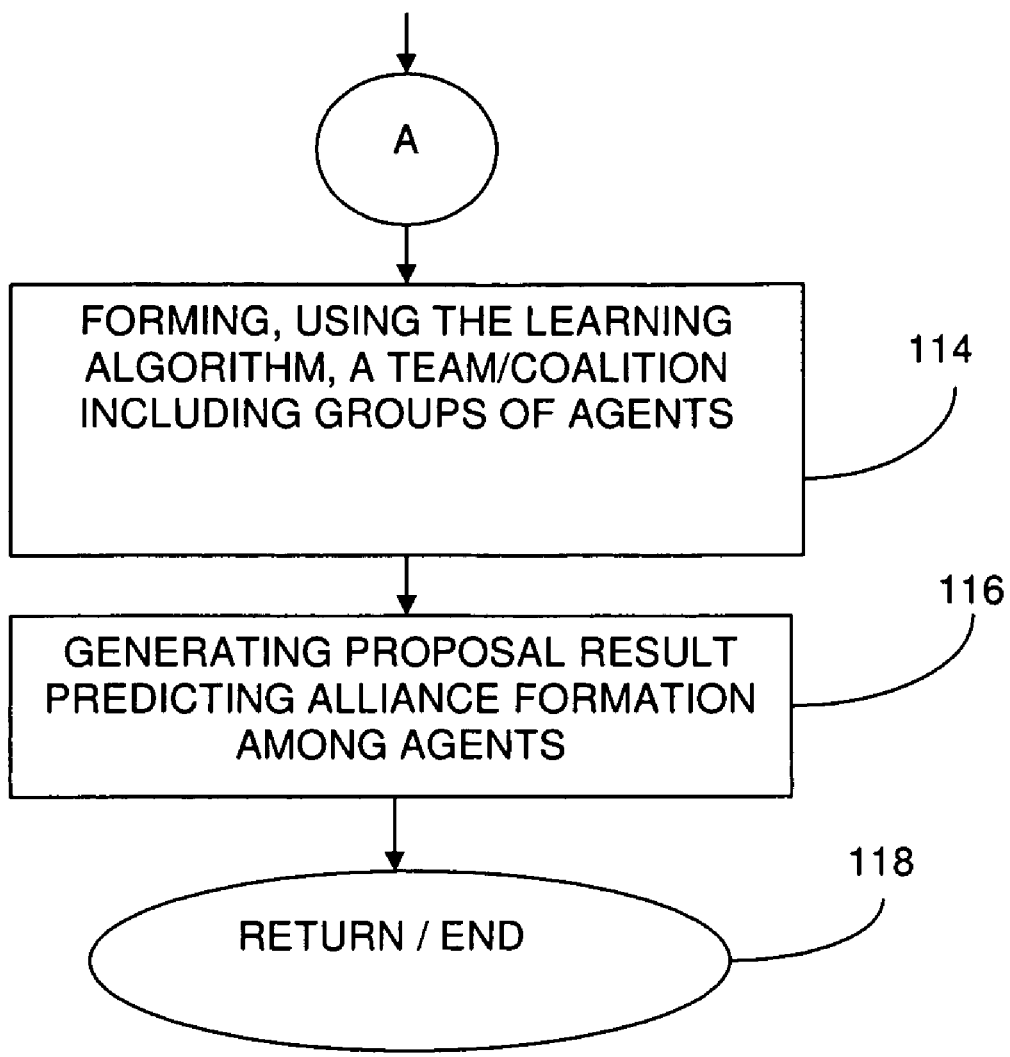
FIG. 1B further illustrates elements of the method of predicting alliance formation among groups.
Figure 2:
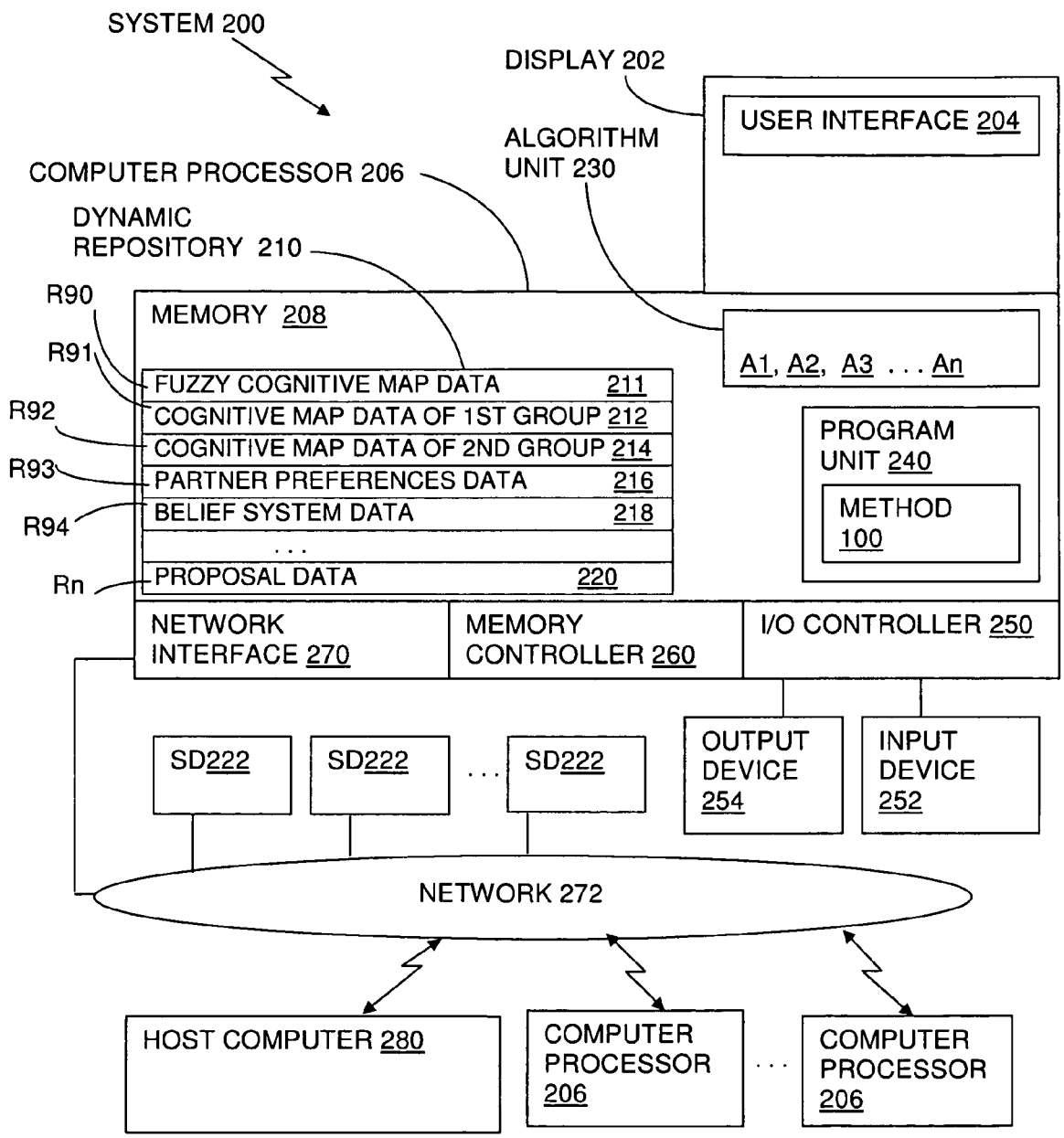
FIG. 2 illustrates a system implementing the method illustrated in FIG. 1A and FIG. 1B.

Referring to FIG. 1A, FIG. 1B, and FIG. 2, in accordance with a first exemplary embodiment, a method 100 (hereafter the "method 100") is implemented in a computer readable and computer executable program executed on a computer system 200 (hereafter the "system 200"). The method 100 is implemented as computer readable and computer executable program code for predicting alliance formation among groups of people. The method 100 automatically determines and/or describes general beliefs of a plurality of agents.

Referring to FIG. 1A, FIG. 1B and FIG. 2, in accordance with exemplary embodiments, the system 200 embodies and implements the various methods, procedures, algorithms, instructions, operations and sub operations of the method 100 in the structure of computer executable program code, computer executable and computer readable media and other hardware, firmware and/or software modules, network applications, and interface platforms, upon which the method 100 can be carried out.

Referring again to FIG. 1A, FIG. 1B and FIG. 2, in accordance with exemplary embodiments, the system 200 includes a computer processor 206 (hereafter "the computer processor 206") communicatively coupled to and/or communicatively coupling either externally or residing inside of the computer processor 206 a plurality of network interface controllers, input/output controllers, input devices and output devices, such as a network interface 270, a memory controller 260, an input/output controller 250 (hereafter "the I/O controller 250"), an input device 252, an output device 254, and a display 202, where the display 202 displays a user interface 204. In exemplary embodiments, software application packages including special purpose algorithms or any other commercially available software application packages can be accessed and exercised interactively by a user using the computer processor 206, either locally or over a network 272.

Referring to FIG. 2, in accordance with exemplary embodiments, the network interface 270 communicatively connects the computer processor 206 to a network 272, where a plurality of client side, server side and/or user networked devices reside, interact and operate communicatively over the network 272. The network 272 can be a wide area communications network, including an Internet or an extranet or the network 272 can be a local area network, including an intranet. These networked devices and systems can include host computers, such as a host computer 280; these devices and systems can include storage devices, such as tape drives, disc drives operating individually or in storage library farms; in exemplary embodiments, a plurality of storage devices can include a device such as one or more of an SD222. These networked devices can also include a plurality of devices, such as the computer processor 206.

Again referring to FIG. 2, in accordance with exemplary embodiments, the input device 252 can be at least one or more of a mouse, a keyboard, a touch screen terminal, a light pen wand, a joystick, a thumbwheel, a copier system or machine, a hardcopy paper scanner system or machine, a microphone or an electronic and/or a radio frequency scanning device (including RFID).

Figure 3A:
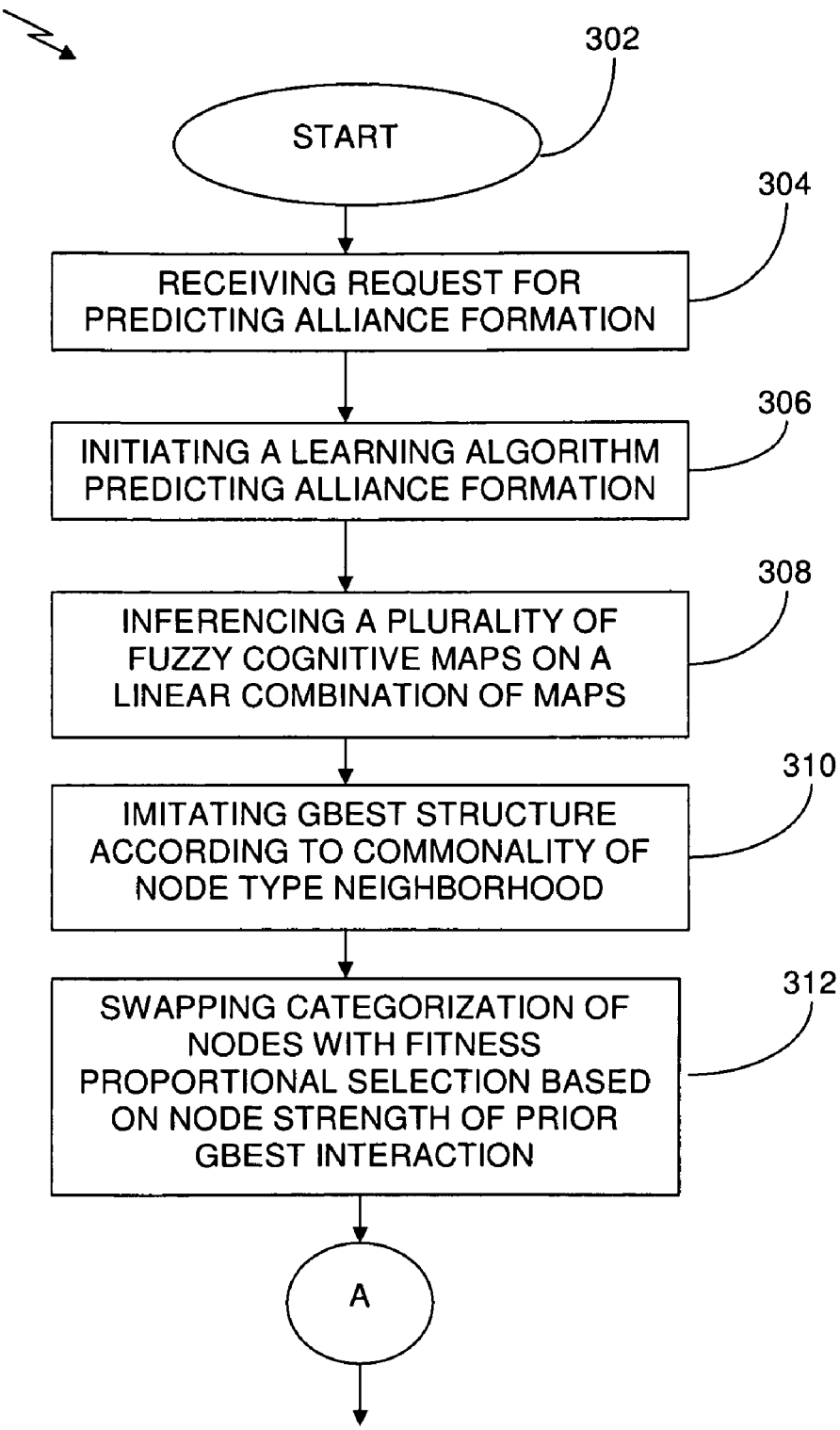
FIG. 3A illustrates elements of the method of predicting alliance formation among groups, by imitating gbest structures and swapping categorization of nodes.
Figure 3B:
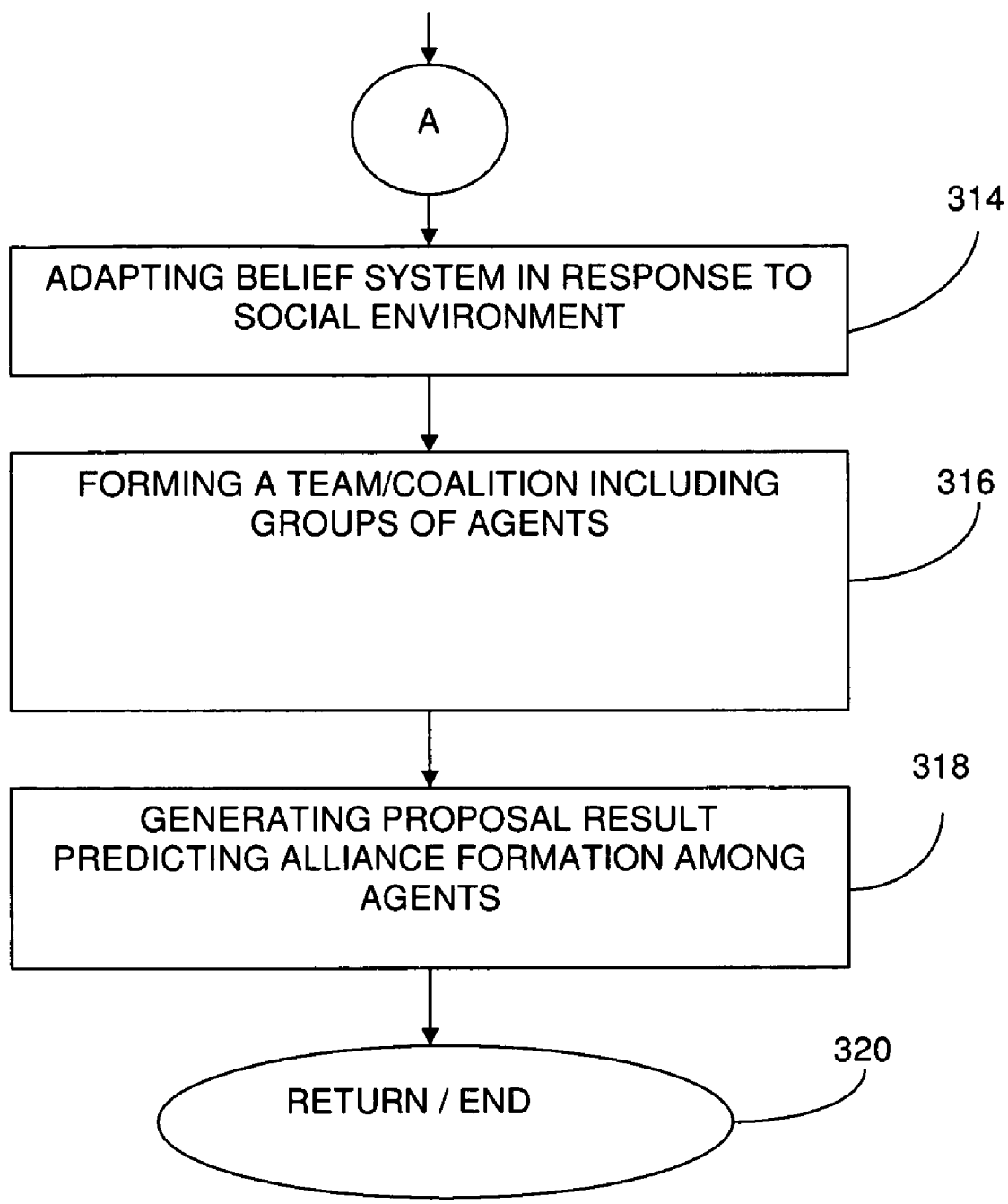
FIG. 3B further illustrates elements of predicting alliance formation among groups, by imitating gbest structures and swapping categorization of nodes.
Figure 4:
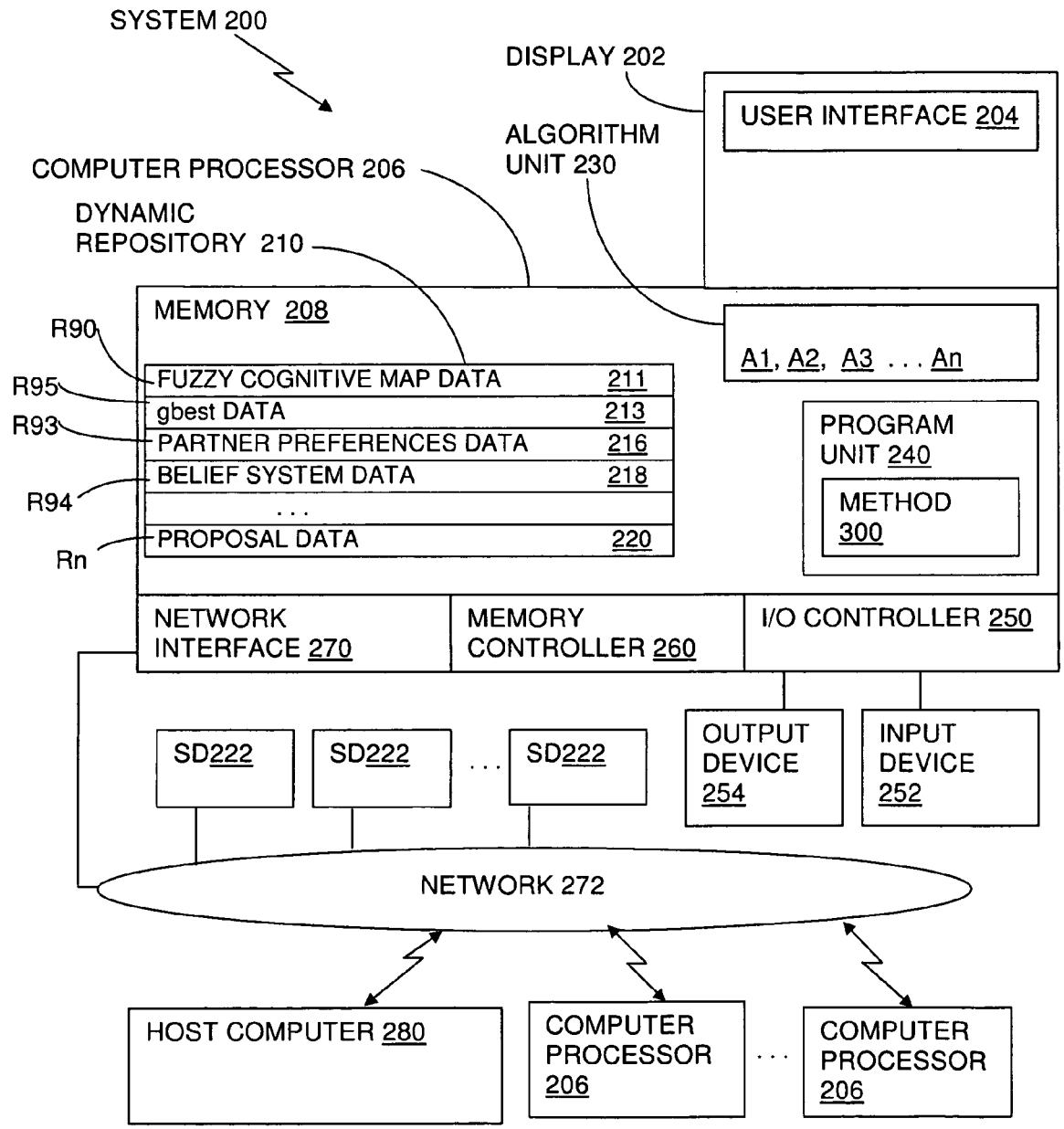
FIG. 4 illustrates a system implementing the method illustrated in FIG. 3A and FIG. 3B.
Figure 5:
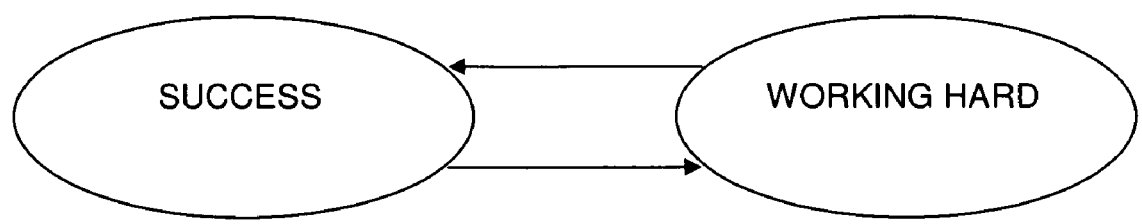
FIG. 5 represents the known cultural belief that "working hard" will lead to success.

In exemplary embodiments, the system 200 and the method 100 illustrated in FIG. 2, FIG. 1A and FIG. 1B, and/or a method 300 as illustrated in FIG. 3A, FIG. 3B and FIG. 4 respectively, can be implemented in software, firmware and/or hardware or any combination of each. According to exemplary embodiments, the method 100 and/or the method 300 are implemented in software, as executable program code, which comprises an ordered listing of a plurality of computer executable instructions for implementing logical functions, and the method 100 and/or the method 300 is executed by either special or general purpose digital computers including a PDA, a personal computer, a workstation, a minicomputer or a mainframe computer.

In exemplary embodiments, the system 200 is implemented with a general purpose digital computer designated as the computer processor 206. The computer processor 206 is a hardware device for executing software implementing the method 100, as well as the method 300. The computer processor 206 can be any custom made or commercially available, off-the-shelf processor, a central processing unit (CPU), one or more auxiliary processors, a semiconductor based microprocessor, in the form of a microchip or chip set, a macroprocesssor or generally any device for executing software instructions. The system 200 when implemented in hardware can include discrete logic circuits having logic gates for implementing logic functions upon data signals, or the system 200 can include an application specific integrated circuit (ASIC).

Referring to FIG. 2, in accordance with exemplary embodiments, the computer processor 206 further includes a memory 208 (hereafter "the memory 208"). Residing in the memory 208 are a program unit 240 (hereafter "the program unit 240") and a dynamic repository 210 (hereafter "the dynamic repository 210"). Residing in the dynamic repository 210 are a plurality of repository entry locations R90, R91, R92, R93, R94, up to and including Rn, where Rn theoretically represents an infinite number of repository entry locations limited only by known physical and/or virtual memory capacity. Thus, each repository entry location R90 up to Rn can hold, store and/or save a plurality of information and/or data including data such as fuzzy cognitive map data 211, represented as being stored in repository entry location R90; cognitive map data of a 1st group 212, represented as being stored in repository entry location R91; cognitive map data of a 2nd group 214, stored and/or saved in repository entry location R92; partner preferences data 216, held in repository entry location R93, belief system data 218, stored in repository entry location R94; and proposal data 220, saved in representative repository entry location Rn. Cognitive maps (including fuzzy cognitive maps) represent belief assertions which can lead to intent and then if, matched with a set of circumstances, to behavior. The leap from belief to intent can be made but the leap to behavior cannot be made so easily. For example, one can believe that taxes are unjust but that does not mean that one is not going to pay one's income taxes. These groups of data and information can be easily and programmatically accessed and exercised by computer processor 206 to provide various solutions to coalition forming related problems, including mathematical calculations, analyses and determinations of economic factors affecting coalition formation. In addition, a plurality of other data and information may be entered into the repository entry locations R90 through Rn; these groups of information and data, including the plurality of other data can be stored temporarily and/or permanently and/or semi permanently in the repository entry locations R90 through Rn or stored over the network 272 in any of the plurality of storage devices residing on and/or communicatively coupled to the network 272, including the SD222. In exemplary embodiments, these groups of information and data can be downloaded programmatically over the network 272 or entered manually by way of the input device 252.

Referring again to FIG. 2, in accordance with exemplary embodiments, the memory 208 further includes an algorithm unit 230. Residing in the algorithm unit 230, is a plurality of algorithms such as an algorithm A1, an algorithm A2, an algorithm A3 up to and including an algorithm An, where the algorithm An theoretically represents an infinite number of algorithms limited only by known physical and/or virtual memory capacity. In exemplary embodiments, algorithm A1 means Algorithm (1), algorithm A2 means Algorithm (2) and algorithm A3 means a PSO algorithm, such as Algorithm (3). These algorithms can be in the form of one or more formulas, applets, programs, routines, sub routines, macro programs and/or micro programs and/or any combination of such programs, applets and formulas. In exemplary embodiments, these algorithms and/or formulas are represented as either individual segments of knowledge base applications which are called and/or executed to arrive at predictions of alliance formation among groups, by determining and/or describing general beliefs of a plurality of agents or these algorithms and/or formulas are combined with other data to perform routine computational tasks in regard to providing required data and determinations in the form or transforming raw data (by the use of learning algorithms) into alliance formation predictions. These algorithms and/or formulas are called by programmatic operations of the method 100 and/or the method 300, either automatically or manually to perform computational and predictive tasks. Furthermore, these algorithms can be stored temporarily and/or permanently and/or semi permanently in the algorithm unit 230 or stored over the network 272 in any of the plurality of computers or storage devices, such as the SD222 or in a repository (such as the dynamic repository 210) in the computer processor 206 or in the host computer 280 or in any one or more of the computer processor 206. In exemplary embodiments, the plurality of algorithms and/or formulas can be downloaded programmatically over the network 272 or entered manually by way of the input device 252.

Referring to FIG. 2, FIG. 4, FIG. 7A and FIG. 7B, in accordance with exemplary embodiments, residing in the program unit 240 is a plurality of computer readable and computer executable media (such as a computer usable medium 1302) which contain a plurality of computer programs, or algorithms and/or software applications, composing operations, instructions and/or procedures of the method 100 and/or the method 300 encoded as computer readable and computer executable program code, contained in a computer program product 1300. In exemplary embodiments, software in the program unit 240 includes a suitable operating system.

In exemplary embodiments, referring to FIG. 2 and FIG. 4, the memory 208 and the dynamic repository 210 and the plurality of storage devices including such devices as the SD222 can include any one of or a combination of volatile memory elements, including random access memory (i.e., including RAM, DRAM, SRAM and/or SDRAM) and non-volatile memory elements including read only memory (i.e., ROM, erasable programmable read only memory, electronically erasable programmable read only memory EEPROM, programmable read only memory PROM, and/or compact disc read only memory CDROM or FLASH memory or cache) magnetic tape, disk, diskette, cartridge, cassette and/or optical memory. The memory 208 can have an architecture where various components are situated remotely from one another, but can be accessed by the computer processor 206, either directly and/or locally or logically through various communications buses or remotely over the network 272.

Referring to FIG. 1A and FIG. 2, in accordance with a first exemplary embodiment, at an operation start 102 (hereafter "the operation 102"), the system 200 receives a signal from an operator or an individual user via either the input device 252 or an automatic programmatic wake up signal from the computer processor 206, which activates and initiates the computer executable program code implementing the method 100. The method 100, upon activation, performs other operations from selection signals received in the computer processor 206 from the input device 252, causing the method 100 to be executed by the computer processor 206 and in turn causing the computer processor 206 to perform operations and procedures including calling algorithms and software applications and executing the instructions in the algorithms and applications including mathematical calculations, analyses and determinations of economic factors involving operations and sub operations of the method 100 of providing various solutions in regard to predicting alliance formation among groups of people.

Referring to FIG. 1A and FIG. 2, in accordance with the first exemplary embodiment, at an operation receiving request for predicting alliance formation 104 (hereafter "the operation 104"), the system 200 receives a signal from an operator or an individual user via the input device 252 from the computer processor 206, causing the computer processor 206 to perform operations and procedures including predicting alliance formation among groups of people, including people forming associations, tribal affiliations, economic affiliations, educational affiliations, work environment affiliations, familial affiliations, religious affiliations, social affiliations, educational affiliations, as well as military affiliations and organizations.

Referring again to FIG. 1A and FIG. 2, in accordance with the first exemplary embodiment, at an operation initiating a learning algorithm predicting alliance formation 106 (hereafter "the operation 106"), the program code of the method 100 executed by the computer processor 206 of the system 200 causes the computer processor 206 to receive an initiation request, from the computer executable program code of the method 100 requesting a determination and/or a prediction in regard to forming a coalition. The request may be in the form of a signal from a local user or a remote user and/or operator and/or client sent from the remote user's and/or client computer system, transmitted over the network 272 and received by the computer processor 206 or the request may be input through the input device 252 by a user of the computer processor 206, after the local user (i.e., local to the computer processor 206) receives the request for predicting coalition formation via some other media including voice or hardcopy paper, receipt of the request causes the computer processor 206 to automatically and/or programmatically execute the computer readable and executable program of the method 100 of predicting alliance formation among groups.

Referring to FIG. 1A, FIG. 2, FIG. 8, FIG. 12 and FIG. 13 in accordance with the first exemplary embodiment, at an operation inferencing a plurality of fuzzy cognitive maps on a linear combination of maps 108 (hereafter "the operation 108"), in response to the user's request for predicting coalition formation among groups, the program code of the method 100 executed by the computer processor 206, causes the computer processor 206 to automatically perform operations of inferencing a plurality of fuzzy cognitive maps on a linear combination of a plurality of cognitive maps of a first group of agents from the plurality of agents, where the plurality of agents include cognitive agents. Cognitive agents in a BDI model are proactive, deliberative, adaptive (see FIG. 8) and social (see FIG. 8 and FIG. 13). The BDI model includes the influences on the cognitive agents of beliefs, desires, intentions and behavior (see FIG. 8). Coalition formation in cognitive agents includes: (1) episodic memory (i.e., preferences evolve from interactions); (2) different values, hidden payoffs (i.e., interactions might lead to clashes of values); (3) modeling of the opponent (i.e., the actions of the other player matter

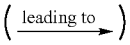

social dependence); and (4) coalition formation in cognitive agents includes the premises that coalitions are driven by desire for homogeneity and are driven away from differences (i.e., interactions are risk-reducing behavior).

A cognitive map is represented internally as an adjacency matrix. As the cognitive map transfer learning simulation progresses, neighborhoods are formed (i.e., local best, also, known as lbest). The weight between two concepts is learned through PSO; and the structure of the cognitive maps (i.e., policy, desirable and undesirable nodes) is imitated from the local best according to social impact theory.

In exemplary embodiments, interaction inferencing includes the premises that:

(1) where cognitive maps are exchanged during an interaction, then cognitive maps can be combined to evaluate synergy;

(2) strength of nodes at convergence can be predicted when the strength of the causal assertions is given as $$A_i(t+1) = f\left(A_i(t) + \sum_j^{causes} w_{ij} A_j(t)\right); \quad \text{formula (3)}$$

(3) interaction fitness is characterized by the satisfaction of the following relationship:

$$fitness(t) = \frac{\sum_i^{desirables} A_i(t)}{\sum_i^{desirables} A_i(t) + \sum_j^{undesirables} A_j(t)}; \text{ and} \quad \text{formula (4)}$$

(4) translation is implemented on a spatial grid (see Algorithm (1)).

Referring to FIG. 1A, and FIG. 2, in accordance with the first exemplary embodiment, at an operation interacting of agents representing partner preferences 110 (hereafter "the operation 110"), the program code of the method 100 executed by the computer processor 206, causes the computer processor 206 to perform interactions by the first group of agents from the plurality of agents with a second group of agents of the plurality of agents, wherein one or more agents of the first and second groups of agents represent partner preferences.

Referring to FIG. 1A, and FIG. 2, in accordance with the first exemplary embodiment, at an operation adapting belief system in response to social environment 112 (hereafter "the operation 112"), the program code of the method 100 executed by the computer processor 206, causes the computer processor 206 to automatically cause adapting, by the first group of agents, a belief system represented by the linear combination of cognitive maps, in response to a social environment represented by a belief system of the second group of agents interacted with.

Referring to FIG. 1A, FIG. 1B, FIG. 2 and FIG. 10, in accordance with the first exemplary embodiment, at an operation forming, using the learning algorithm, a team and/or coalition including groups of agents 114 (hereafter "the operation 114"), the program code of the method 100 executed by the computer processor 206, causes the computer processor 206 to form a team and/or coalition including the first group of agents and the second group of agents, based on inferencing and modifying beliefs, by learning mental properties through experience (over time), to achieve mutual (consonant and/or complementary) beliefs among the first group of agents and the second group of agents, by using the learning algorithm; where; the learning algorithm includes a cognitive social agent loop represented by the following learning algorithm (i.e., Algorithm (1)) as:

```
ALGORITHM (1)

initialize partner preferences
initialize cognitive map
active ←true
WHILE (no termination condition) DO
    IF (active) THEN
        select partner from neighborhood
        interact with partner
        active ←false
    ELSE
        update mental model
        update spatial grid
        toggle active flag
        active ←true
    ENDIF
END WHILE.
```

Figure 10:
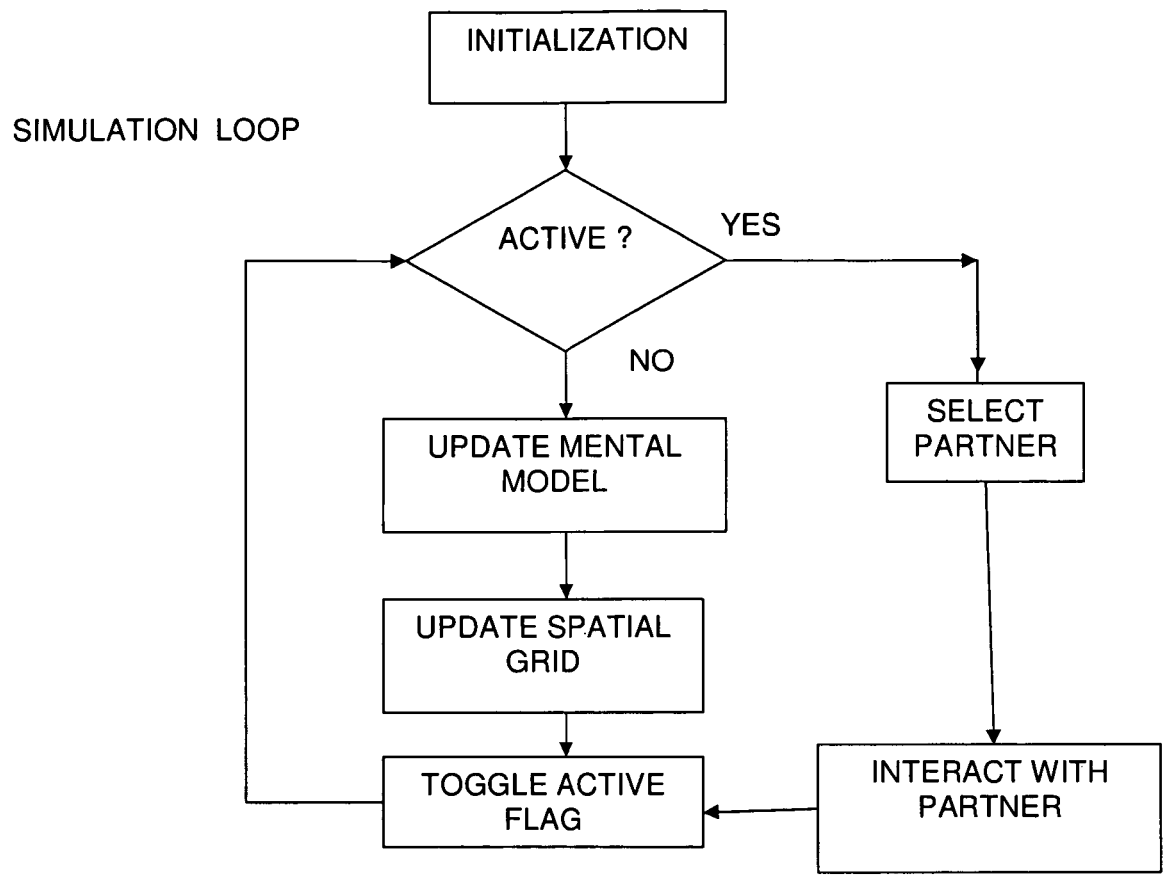
FIG. 10 illustrates a simulation loop representative of a learning algorithm, such as Algorithm (1).

Algorithm (1) describes the general behavior of an agent (see FIG. 10). The interaction outcome is obtained by the inference of fuzzy cognitive maps on the linear combination of the cognitive maps of the agents involved.

Referring to FIG. 1A, FIG. 1B, and FIG. 2, in accordance with the first exemplary embodiment, at an operation generating proposal result predicting alliance formation among agents 116 (hereafter "the operation 116"), the program code of the method 100 executed by the computer processor 206, causes the computer processor 206, to generate a proposal result predicting alliance formation among the first group of agents and the second group of agents. The generated proposal result predicting alliance formation among the first and second groups of agents, can be saved and/or printed at the local or at a remote output device, such as the output device 254 and/or transmitted electronically over the network 272 to one or more remote users. The proposal result can be visualized on a two dimensional (2D) grid of a display, such as the display 202 and measured with a clustering metric.

Referring to FIG. 1A, FIG. 1B, and FIG. 2, in accordance with the first exemplary embodiment, at an operation return/end 118, (hereafter "the operation 118"), the program code of the method 100 executed by the computer processor 206, causes the computer processor 206 to automatically either return to any of the above operations and iteratively perform any one or more of the operations until the appropriate predicting of coalition formation is completed. Or, the program code of the method 100 executed by the computer processor 206, causes the computer processor 206 to end, when program code of the method 100 receives a signal to stop.

In a second exemplary embodiment, referring to FIG. 3A, FIG. 3B and FIG. 4, the method 300 is implemented in the system 200.

Referring to FIG. 3A and FIG. 4, in accordance with the second exemplary embodiment, at an operation start 302 (hereafter "the operation 302"), the system 200 receives a signal from an operator or an individual user via either the input device 252 or an automatic programmatic wake up signal from the computer processor 206, which activates and initiates the computer executable program code implementing the method 300, which upon activation, performs other operations from selection signals received in the computer processor 206 from the input device 252, causing the method 300 to be executed by the computer processor 206 and in turn causing the computer processor 206 to perform operations and procedures including calling algorithms and software applications and executing the instructions in the algorithms and applications including mathematical calculations, analyses and determinations of economic factors involving operations and sub operations of the method 300 of providing various solutions in regard to predicting alliance formation among groups of people.

Referring to FIG. 3A and FIG. 4, in accordance with the second exemplary embodiment, at an operation of receiving request for predicting alliance formation 304 (hereafter "the operation 304"), the system 200 receives a signal from an operator causing the computer processor 206 to perform operations and procedures including predicting alliance formation among groups of people.

Referring again to FIG. 3A, FIG. 4 and FIG. 11, in accordance with the second exemplary embodiment, at an operation initiating a learning algorithm predicting alliance formation 306 (hereafter "the operation 306"), the program code of the method 300 executed by the computer processor 206 of the system 200 causes the computer processor 206 to receive an initiation request, from the computer executable program code of the method 300 requesting a determination and/or a prediction in regard to forming a coalition, as discussed in regard to the method 100. Thus, receipt of the request causes the computer processor 206 to execute the computer readable and executable program of the method 300 of predicting alliance formation among groups.

In accordance with the second exemplary embodiment, the learning algorithm includes a cognitive social agent loop simulation represented by the following algorithm (i.e., Algorithm (2)) as:

---
ALGORITHM (2)
---
initialize partner preferences
initialize cognitive map
lbest ←cognitive map
active ←true
WHILE (no termination condition) DO
   IF (active) THEN
      select partner from neighborhood
      interact with partner
      update lbest from interaction outcome
      update partner preference
      active ←false
   ELSE
      get gbest from neighborhood
      update cognitive map from gbest
         and lbest
      move closer or farther from partner
      active ←true
   ENDIF
END WHILE.

---

Figure 11:
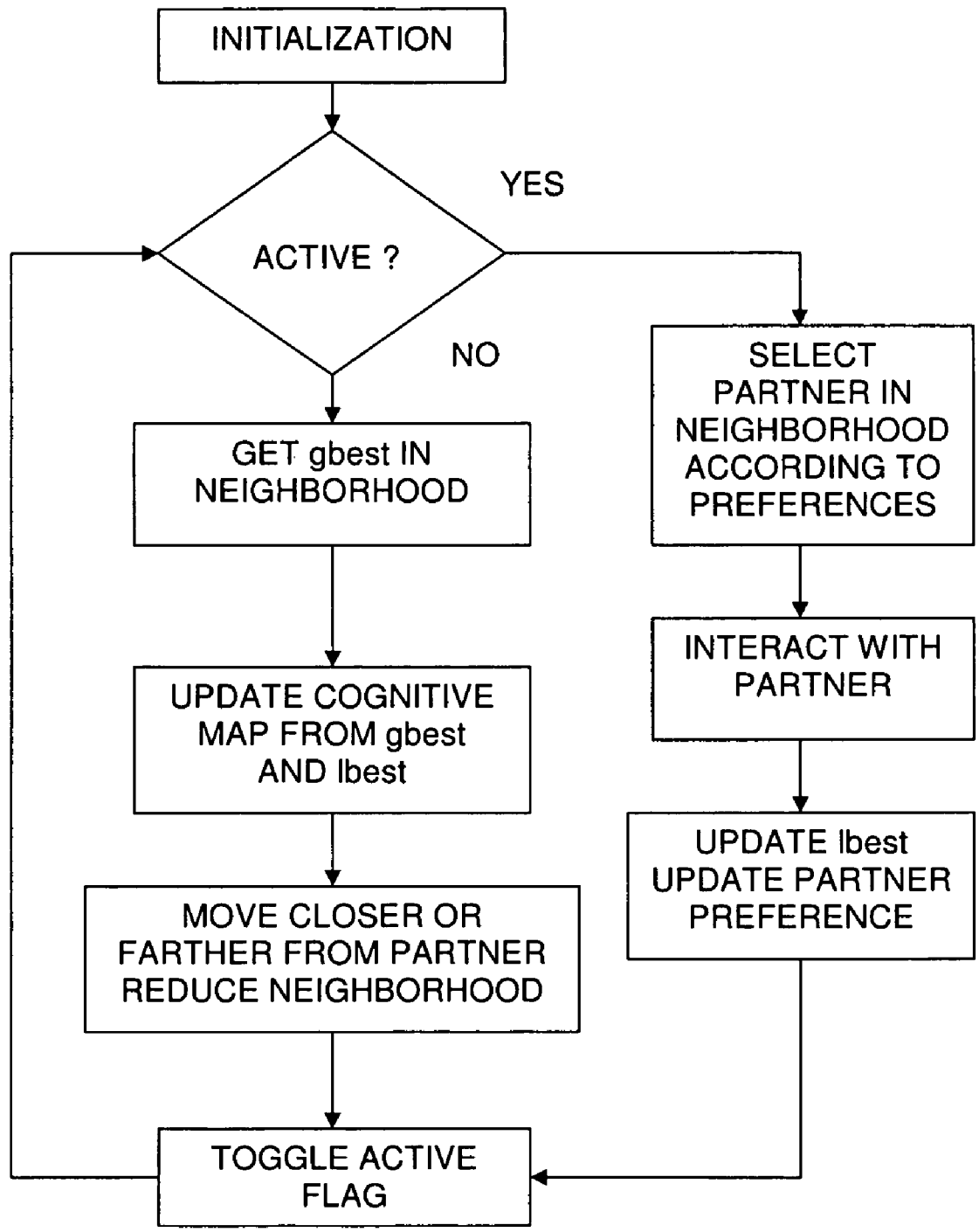
FIG. 11 illustrates a cognitive simulation (cogsim) loop representative of a learning algorithm, such as Algorithm (2).
Figure 12:
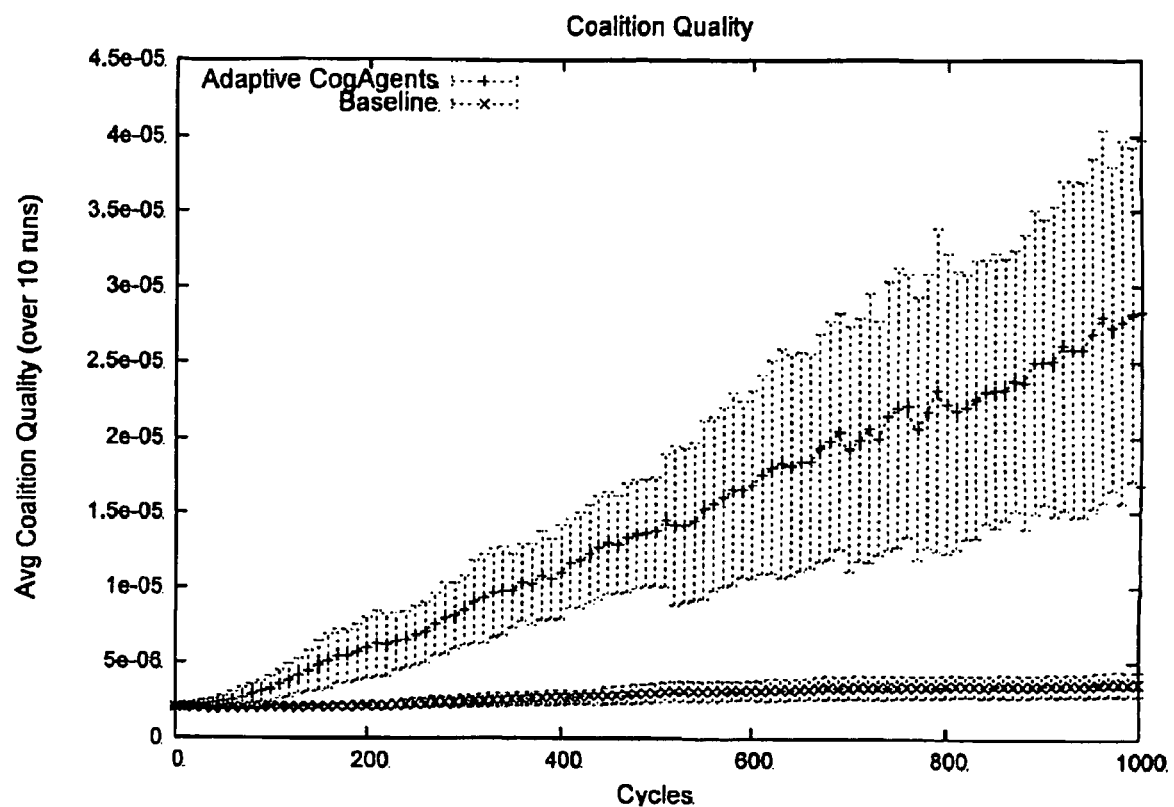
FIG. 12 illustrates a canonical evaluation graphic of coalition quality.
Figure 13:
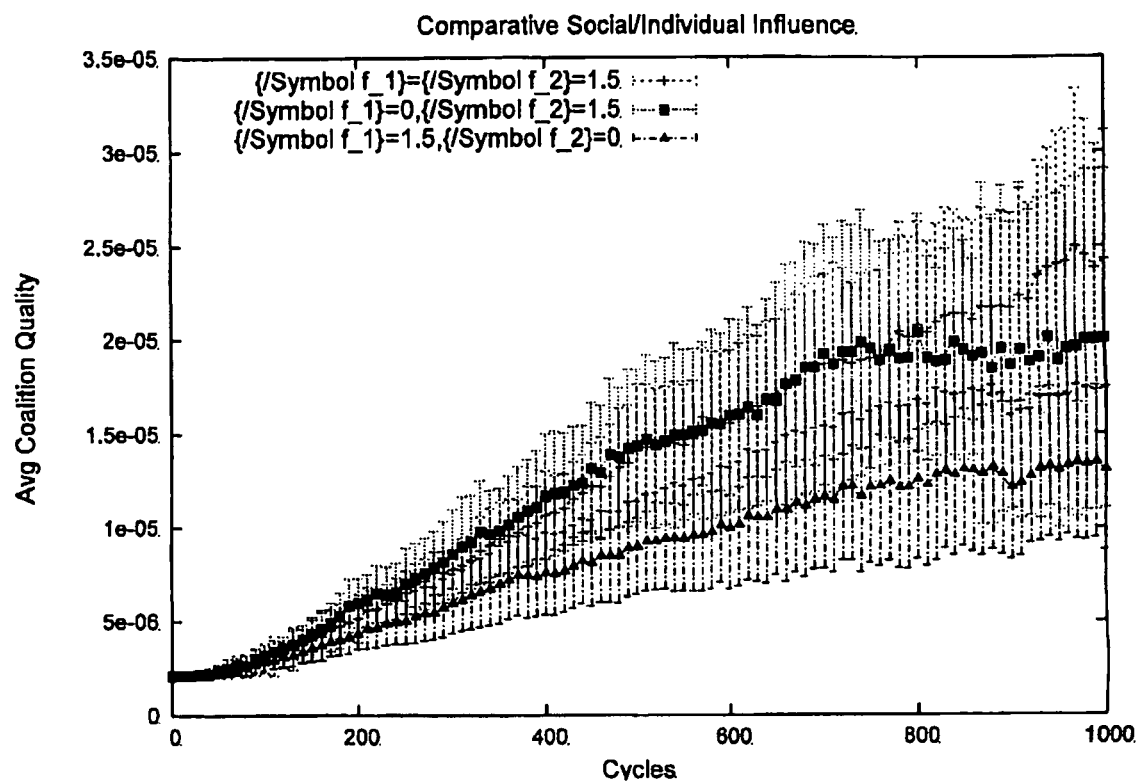
FIG. 13 illustrates a comparative evaluation graphic of coalition quality.

Algorithm (2) describes the general behavior of an agent (see FIG. 11). The interaction outcome is obtained by the inference of fuzzy cognitive maps on the linear combination of the cognitive maps of the agents involved.

Referring to FIG. 3A and FIG. 4 in accordance with the second exemplary embodiment, at an operation inferencing a plurality of fuzzy cognitive maps on a linear combination of maps 308 (hereafter "the operation 308"), in response to the user's request for predicting coalition formation among groups, the program code of the method 300 executed by the computer processor 206, causes the computer processor 206 to automatically perform operations of inferencing a plurality of fuzzy cognitive maps on a linear combination of a plurality of cognitive maps of a first group of agents from the plurality of agents, where the plurality of agents includes cognitive agents.

In accordance with exemplary embodiments, a PSO algorithm is applied to optimize the weights assigned to a fuzzy cognitive map representing a process control system. The output is the best-so-far cognitive map in the population defined by maximizing the strength of the output concepts within their allowed bounds producing structural differences between agents and differentiation between desirable and undesirable output concepts. Unlike cognitive agents of the exemplary embodiments, there is no differentiation between desirable and undesirable output concepts and no structural difference between agents used in previous coalition prediction experiments and/or studies.

Figure 6:
FIG. 6 illustrates a cognitive map structure imitation from gbest, where the categorization of the nodes is swapped with a fitness proportional selection based on the node strength from the last or a previous gbest interaction and the commonality of the node in the agent's neighborhood.
Figure 7A:
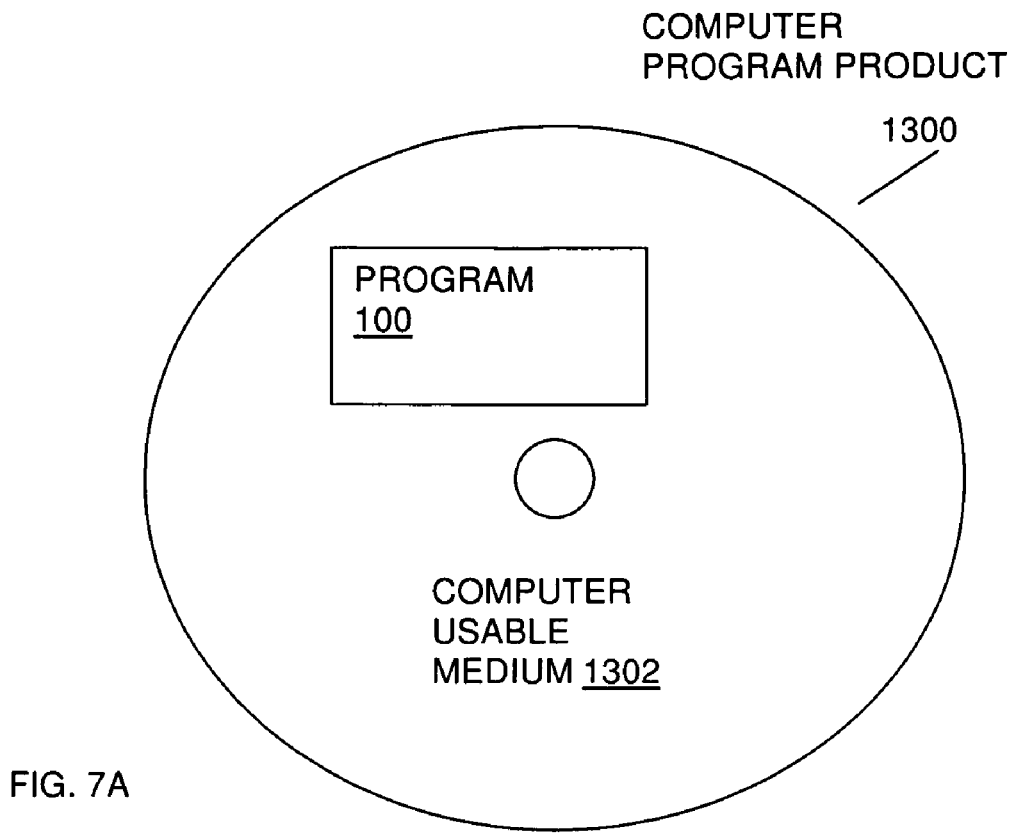
FIG. 7A illustrates an exemplary computer readable and computer executable medium containing a program product including program logic and instructions of a method 100 executed on a system 200 implementing the method of predicting alliance formation among groups.
Figure 7B:
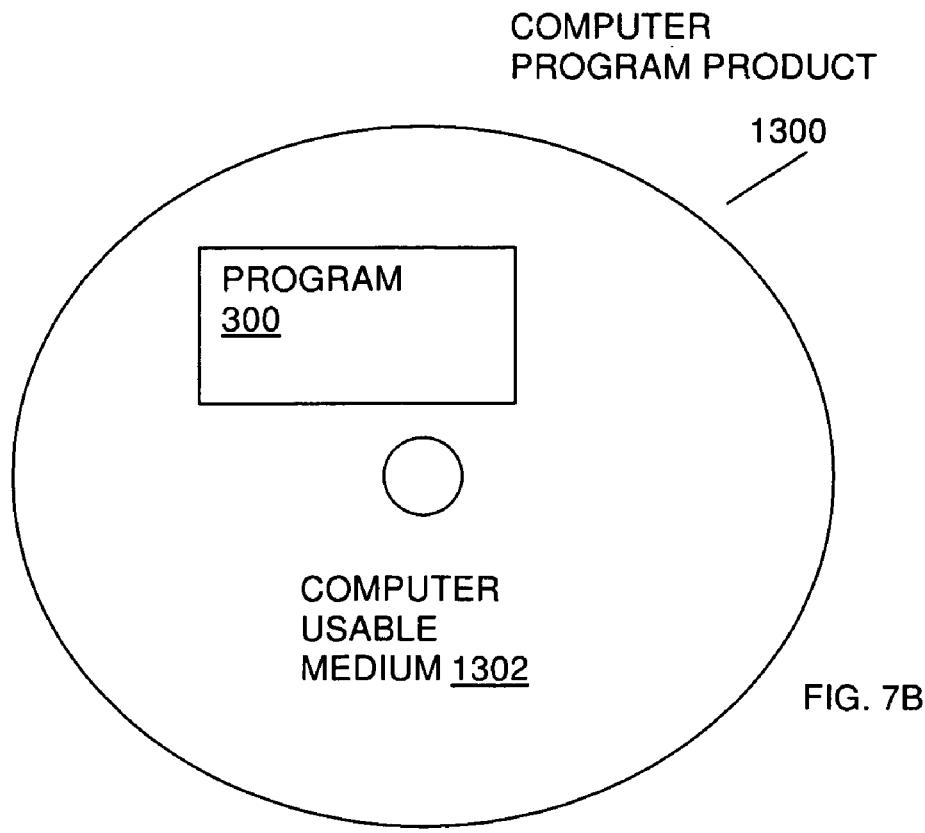
FIG. 7B illustrates an exemplary computer readable and computer executable medium containing a program product including program logic and instructions of a method 300 executed on the system 200 implementing predicting alliance formation among groups.
Figure 8:
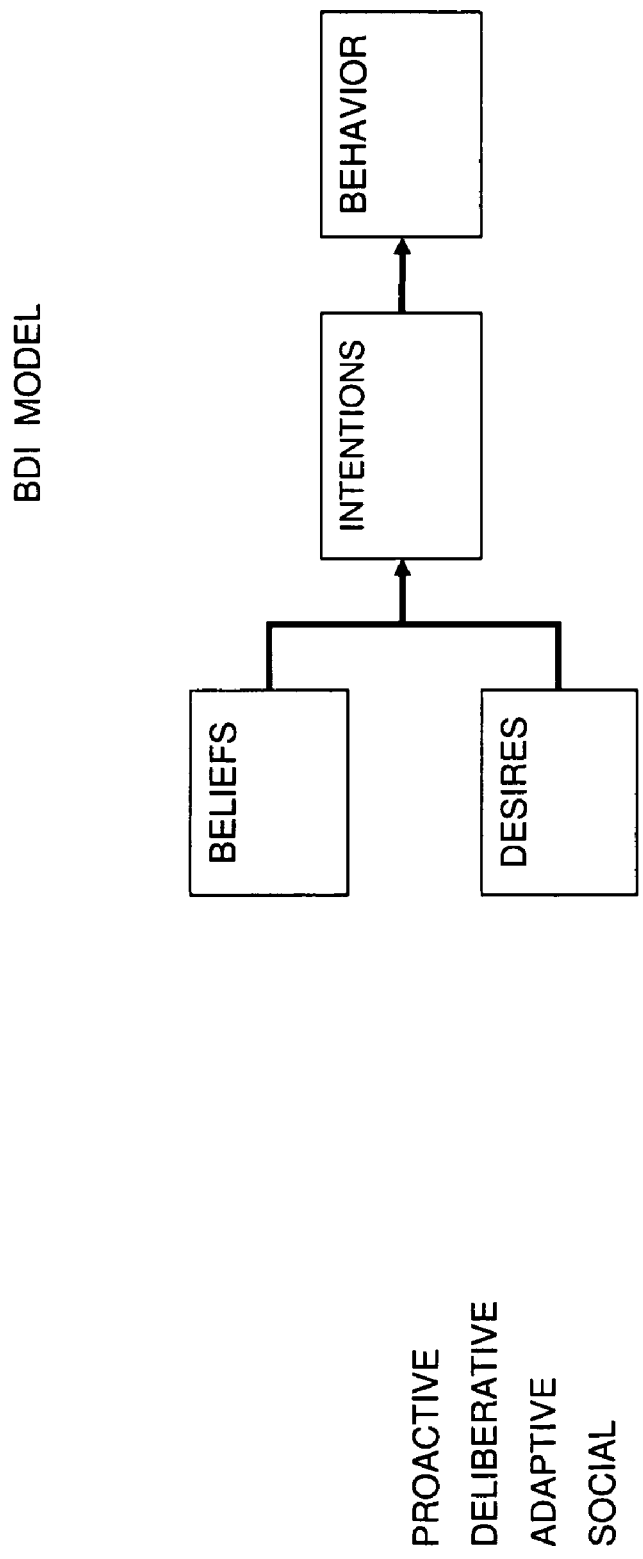
FIG. 8 illustrates a beliefs-desires-intentions (BDI) model.
Figure 9:
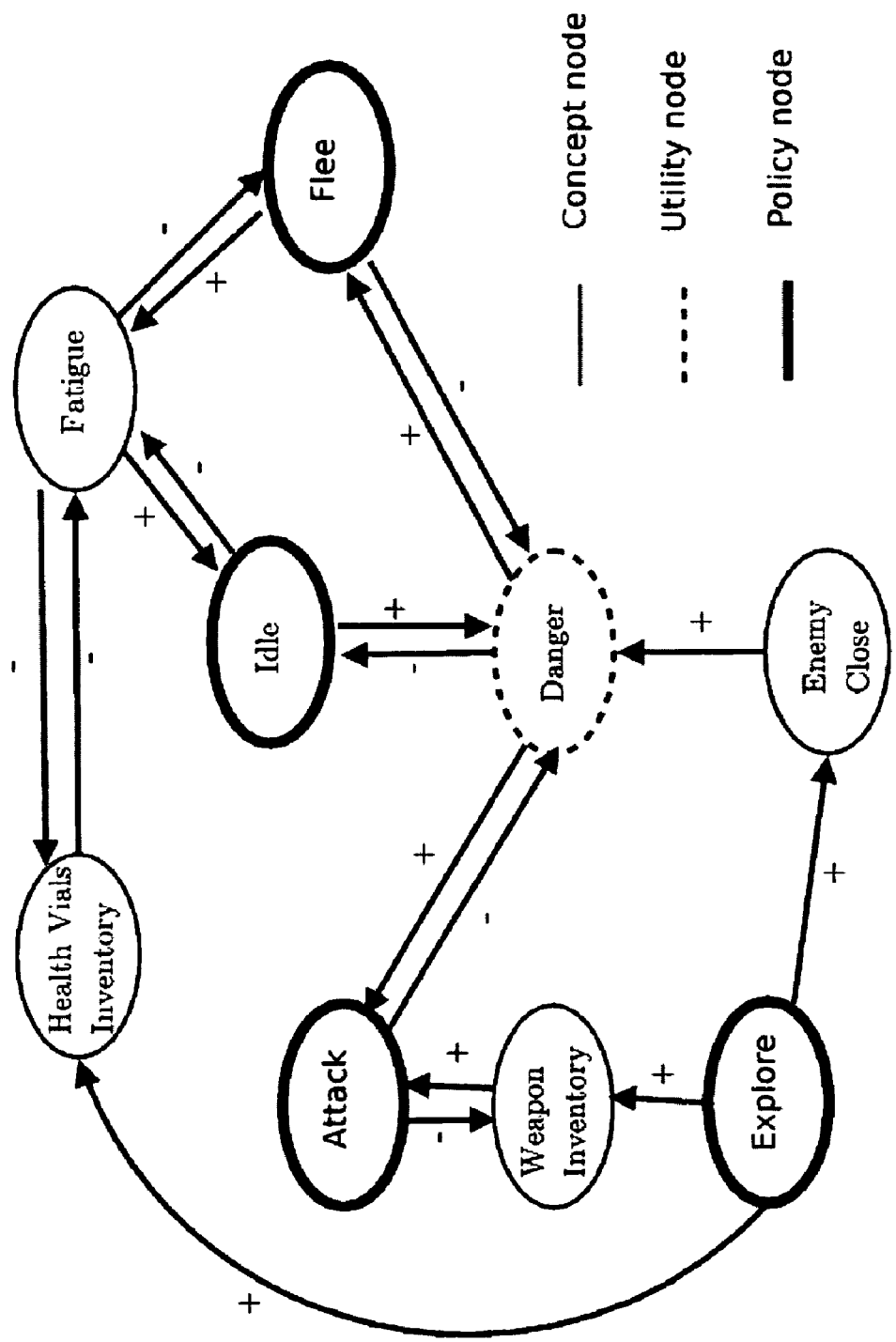
FIG. 9 illustrates an agent mental model cognitive map.

Referring to FIG. 1A, FIG. 4 and FIG. 6 in accordance with the second exemplary embodiment, at an operation imitating gbest structure according to commonality of node type neighborhood 310 (hereafter "the operation 310"), the program code of the method 300 including the learning algorithm executed by the computer processor 206, causes the computer processor 206 to automatically perform operations of imitating a gbest structure according to a commonality of a given node type neighborhood. The structure of gbest (i.e., normative knowledge of a global best) is limited according to the commonality of the node type in the neighborhood (see FIG. 6). Agents alternate concurrently between active and passive states.

Referring to FIG. 3A, FIG. 3B, FIG. 4, FIG. 9 and FIG. 10, in accordance with the second exemplary embodiment, at an operation swapping categorization of nodes with fitness proportional selection based on node strength of prior gbest interaction 312 (hereafter "the operation 312"), the computer processor 206 automatically swaps categorization of nodes with fitness proportional selection considerations, based on node strength of prior gbest interactions. In exemplary embodiments, agents co-evolve through peer-to-peer interactions and combined mental models (see FIG. 9). The goal of construct is to evaluate the mechanism of information diffusion in an organization based on how well the agents perform in a canonical classification task. However, information about other agents is not directly disseminated since the selection of an interaction partner is based solely on subjective preferences. Information about other agents is indirectly propagated through the influence of the neighborhood global best. In exemplary embodiments, agents are not explicitly situated in an organization but are individuals trying to self-organize through the emulation of peers. It is possible to initially set the spatial configuration of the agents to test whether the groups are sustainable.

Nexus agents have a mental model represented as Boltzmann machine neural networks through which they interpret current social situations such as beliefs of trustworthiness, support or blame of other social groups. Based on the theory of cognitive dissonance and narrative paradigms, the Boltzmann machine conflicts those beliefs to indicate final support to certain groups. In regard to Nexus agents, the agents interpret current situations through the inference prism of their mental model. Unlike Nexus agents, the cognitive map agents described in the exemplary embodiments have no direct beliefs characterizing other agents or groups but beliefs on the cause and effect of certain concepts that indirectly affect group formation.

In exemplary embodiments, this approach provides insight on what causes groups to emerge or diverge at a more fundamental level than the stated position and influence of key actors. This approach can be used to model the interactions of agents from different cultures represented by a set of prescriptive rules (e.g., proverbs). In exemplary embodiments, the impact of a foreign presence in a multi-ethnic society can be modeled, quantified and evaluated over several time cycles, based on the interaction of cognitive map agents. While an assumption of this approach is that policy nodes (see FIG. 9)

trigger certain known effects, it is useful to quantify the causal beliefs, or political will, that need to be associated for a given policy (set of policy nodes) to be successful. Comparisons between initial and final cognitive map variants can provide structural content insights in addition to predictive trends.

Two species of the method 100 include (1) how to incorporate belief changes and adaptation in group formation and (2) how to evolve the structural parameters of cognitive maps.

Referring to FIG. 3A, FIG. 3B, FIG. 4 and FIG. 8, in accordance with the second exemplary embodiment, at an operation adapting belief system in response to social environment 314 (hereafter "the operation 314"), the computer processor 206 automatically causes agents to adapt their belief system, represented by a cognitive map, in response to their social environment represented by the belief system of other agents they interact with. In accordance with exemplary embodiments, cognitive agents are distinguished from state-based reactive agents by their capability to be proactive in the pursuit of their goals, desires, and intentions. In their interactions with other agents, beliefs on the indirect outcome of possible actions and not just the current situation, can influence the degree of cooperation or conflicts between agents.

Referring to FIG. 3A, FIG. 3B and FIG. 4, in accordance with the second exemplary embodiment, at an operation forming a team/coalition including groups of agents 316, (hereafter "the operation 316"), the computer processor 206, upon receipt of a programmatic or manual signal from the input device 252, automatically performs calculations and transforms raw data into the team and/or coalition data, by calling a learning algorithm, such as the Algorithm (2). Thus, Algorithm (2) is called by the program code of the method 300 and executed on the computer processor 206 to perform these calculations and transformations.

Prior to the methods and systems of the exemplary embodiments, very few efforts have concentrated on team formation based on the inference and modification of beliefs. In regard to agent based modeling in collaborative decision making (CDM), Teamwork of STATE OPERATOR AND RESULT (SOAR) agents in a SHELL FOR TEAMWORK (STEAM) are based on the theory that joint intentions assume shared mental properties of choice and commitment, but rely on the explicit communication of those mental properties to achieve mutual belief rather than learning those mental properties thorough experience. Game-theoretical approaches on coalition formation do not take into account the inference and adaptation capability of cognitive agents from interactions with other agents but rather the deterministic position and influence of the agents in a social network evolving over time (see FIG. 12 and FIG. 13). In game theoretical assumptions in coalition formation there are (1) no restrictions on coalition partners (i.e., symmetry property and memoryless); (2) there is common knowledge of the payoffs (i.e., common values, zero-sum games); (3) individual rationality of the players is assumed (i.e., a coalition must meet the minimum security level of the player, no matter what the other players might do); and (4) bargaining can cause unstable deviations from the status quo for a greater payoff (i.e., bargaining is a risk-inducing behavior).

In the exemplary embodiments, teams or coalitions are formed when the cognitive maps of the individuals are consonant or complementary with each other over time. This coalition forming application can be viewed as the emergence of a specific culture. Algorithm (2) serves as an optimization and statistical estimation algorithm (i.e., statistical estimator). In exemplary embodiments, a learning algorithm can be implemented to train a network as a statistical estimator to determine activity parameters. Activity parameters include, but are not limited to: gbest and lbest parameters (see FIG. 11).

Referring to FIG. 3A, FIG. 3B, FIG. 4, FIG. 12 and FIG. 13, in accordance with the second exemplary embodiment, at an operation generating proposal result predicting alliance formation among agents 318 (hereafter the "operation 318") the computer processor 206 automatically organizes the results of the series of calculations and estimations and generates a proposal report predicting alliance formation among agents and/or groups of people. Organizing includes selecting and/or gathering and/or identifying and/or highlighting specific data. Or the data can be targeted manually by the user or operator who can send a signal via an input device, such as the input device 252, to the system 200 requesting that the resulting data be generated in a report. These data in the report are used by the user and/or operator to verify data integrity and quality of the proposal (see FIG. 12 and FIG. 13). In exemplary embodiments, qualitative evaluation of coalition formation can be evaluated with metrics, such as partition quality metrics (see FIG. 12 and FIG. 13). In such evaluations, iterative k evaluations are performed, where k increases until no further improvement in partition quality can be achieved. After some simplification and leveraging from Bayes Theorem, Fisher's metric combines inter-class dissimilarities and intra-class similarities:

$$P(p_i \mid c_k) = 1 - \frac{dist(p_i c_k)}{\sum_j dis(p_j, c_k)}; \text{ and} \qquad \text{formula (4)}$$

$$\sum_k^{clusters} P(c_k) \sum_i^{particles} P(p_i \mid c_k)^2. \qquad \text{formula (5)}$$

Referring to FIG. 3A, FIG. 3B and FIG. 4, in accordance with the second exemplary embodiment, at an operation return/end 320, (hereafter "the operation 320"), the program code of the method 300 executed by the computer processor 206, causes the computer processor 206 to automatically either return to any of the above operations 304 through 320 and iteratively perform any one or more of the operations until the proposal is completed. Or, the program code of the method 300 executed by the computer processor 206, causes the computer processor 206 to end when the program code of the method 300 receives a signal from the user causing the operations to stop.

In exemplary embodiments, the results formulated in the report(s) are used by the user and/or operator to solicit reaction to the report proposal and then incorporate reaction to events as another source of adaptation.

In exemplary embodiments, the results formulated in the report(s) are used to determine when to introduce new beliefs.

In exemplary embodiments, the results formulated in the report(s) are used to measure impact of foreign presence on a society before belief systems collide.

In exemplary embodiments, the results formulated in the report(s) are used to compare initial and final cognitive maps for structural insights in addition to predictive trends; and in the exemplary embodiments, the results formulated in the report(s) are used to provide a tool to bridge cultures.

Other species of the exemplary embodiments will implement automatic extracting of cognitive maps from text, either text in an electronic format or hard copy paper text.

While the exemplary embodiments have been particularly shown and described with reference to preferred embodiments thereof, it will be understood, by those skilled in the art that the preferred embodiments including the first exemplary embodiment, and the second exemplary embodiment have been presented by way of example only, and not limitation; furthermore, various changes in form and details can be made therein without departing from the spirit and scope of the invention. Thus, the breadth and scope of the present exemplary embodiments should not be limited by any of the above described preferred exemplary embodiments, but should be defined only in accordance with the following claim and/or claims and their equivalents. Any and/or all references cited herein are each entirely incorporated by reference herein, including all data, tables, figures, and text presented in the cited references. Also, it is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one of ordinary skill in the art. The foregoing description of the specific embodiments will so fully reveal the general nature of the invention that others can, by applying knowledge within the skill of the art, readily modify and/or adapt for various applications such specific embodiments, without undue experimentation, without departing from the general concept of the exemplary embodiments. Therefore, such adaptations and modifications are intended to be within the meaning and range of equivalents of the disclosed embodiments, based on the teaching and guidance presented herein.

What is claimed is:

1. A method, implemented in a computer readable and executable program on a computer processor, predicting alliance formation among groups, the method comprising:

receiving, a request for predicting alliance formation among groups;

initiating a learning algorithm, by the computer processor, causing the computer processor to execute the computer readable and executable program predicting alliance formation among groups;

inferencing a plurality of cognitive maps of a first group of agents from a plurality of agents;

interacting, by the first group of agents, with a second group of agents from the plurality of agents;

adapting, by the first group of agents, a belief system represented by a linear combination of the plurality of cognitive maps, in response to a social environment represented by a belief system of the second group of agents interacted with;

forming a coalition including the first group of agents and the second group of agents, based on inferencing and modifying beliefs, to achieve mutual consonant beliefs among the first group of agents and the second group of agents, using the learning algorithm, wherein the learning algorithm includes a particle swarm optimization and includes a cognitive social agent loop simulation represented as:

```
initialize partner prefrences
initialize cognitive map
lbest ←cognitive map
active ←true
WHILE (no termination condition) DO
    IF (active) THEN
        select partner from neighborhood
        interact with partner
        update lbest from interaction outcome
```

-continued

```
        update partner preference
        active ←false
    ELSE
        get gbest from neighborhood
        update cognitive map from gbest
            and lbest
        move closer or farther from partner
        active ←true
    ENDIF
END WHILE; and
``` generating, by the computer processor, a proposal result predicting alliance formation among the first group of agents and the second group of agents.

2. The method, according to claim 1, wherein predicting alliance formation among groups is based on determining beliefs of the plurality of agents.

3. The method, according to claim 1, wherein the plurality of agents includes cognitive agents.

4. The method, according to claim 1, wherein one or more agents of the first group of agents and the second group of agents represent partner preferences.

5. The method, according to claim 1, wherein the plurality of cognitive maps on the linear combination of the plurality of cognitive maps of the first group of agents is a plurality of fuzzy cognitive maps.

6. The method, according to claim 5, wherein the plurality of fuzzy cognitive maps represents belief assertions.

7. A system of predicting alliance formation among groups, the system comprising:

a computer processor having a display, an input device and an output device;

a network interface communicatively coupling the computer processor to a network; and a memory having a dynamic repository, an algorithm unit and a program unit containing a computer readable and computer executable program; and a memory controller communicatively coupling the computer processor with contents of the dynamic repository, the algorithm unit and the computer readable and computer executable program residing in the program unit, wherein when executed by the computer processor, the computer readable and computer executable program causes the computer processor to perform operations of:

receiving, by the computer processor in real time, a request from a user for predicting alliance formation among groups;

initiating, by the computer processor, a learning algorithm, causing the computer processor to execute the computer readable and computer executable program and to perform operations of:

inferencing a plurality of cognitive maps on a linear combination of a plurality of cognitive maps of a first group of agents from a plurality of agents, imitating a gbest structure according to a commonality of a node type neighborhood, swapping categorization of nodes with fitness proportional selection based, on node strength of prior gbest interaction, using a particle swarm optimization, wherein the learning algorithm is the particle swarm optimization and includes a cognitive social agent loop simulation represented as:

```
initialize partner preferences
initialize cognitive map
lbest ←cognitive map
active ←true
WHILE (no termination condition) DO
    IF (active) THEN
        select partner from neighborhood
        interact with partner
        update lbest from interaction outcome
        update partner preference
        active ←false
    ELSE
        get gbest from neighborhood
        update cognitive map from gbest
            and lbest
        move closer or farther from Partner
        active ←true
    ENDIF
END WHILE,
``` adapting, by the first group of agents, a belief system represented by the linear combination of the plurality of cognitive maps, in response to a social environment represented by a belief system of a second group of agents of the plurality of agents, and forming a team including the first group of agents and the second group of agents, based on inferencing and modifying beliefs, by learning mental properties among the first group of agents and the second group of agents; and generating, by the computer processor, a proposal result predicting alliance formation among the first group of agents and the second group of agents.

8. The system, according to claim 7, wherein predicting alliance formation among groups is based on determining beliefs of the plurality of agents.

9. The system, according to claim 7, wherein the plurality of agents includes cognitive agents.

10. The system, according to claim 7, wherein one or more agents of the first group of agents and the second group of agents represent partner preferences.

11. The system, according to claim 7, wherein the plurality of cognitive maps on the linear combination of the plurality of cognitive maps of the first group of agents is a plurality of fuzzy cognitive maps.

12. The system, according to claim 11, wherein the plurality of fuzzy cognitive maps represent belief assertions.

13. A computer readable medium having a plurality of computer executable instructions in the form of a computer readable and computer executable program executed by a computer processor causing the computer processor to perform a method of predicting alliance formation among groups of people, the plurality of computer executable instructions including:

instructions causing receiving, by the computer processor in real time, of a request, from a user, for predicting alliance formation among groups of people, by initiating a computer readable and computer executable program to perform the method of predicting alliance formation among groups of people;

instructions initiating, by the computer processor, a learning algorithm, further causing the computer processor to perform the method of predicting alliance formation among groups of people;

instructions causing inferencing of a plurality of fuzzy cognitive maps, on a linear combination of a plurality of cognitive maps, of a first group of agents;

instructions causing imitating a gbest structure according to a commonality of a node type neighborhood;

instructions causing swapping categorization of nodes with fitness proportional selection based on node strength of prior gbest interaction using a particle swam optimization, wherein the learning algorithm includes the particle swarm optimization and includes a cognitive social agent loon simulation represented as:

```
initialize partner preferences
initialize cognitive map
lbest ←cognitive map
active ←true
WHILE (no termination condition) DO
    IF (active) THEN
        select partner from neighborhood
        interact with partner
        update lbest from interaction outcome
        update partner preference
        active ←false
    ELSE
        get gbest from neighborhood
        update cognitive map from gbest
            and lbest
        move closer or farther from partner
        active ←true
    ENDIF
END WHILE;
``` instructions causing adapting, by the first group of agents, a belief system represented by the linear combination of the plurality of fuzzy cognitive maps, in response to a social environment represented by a belief system of a second group of agents;

instructions causing forming a team including the first group of agents and the second group of agents, based on inferencing and modifying beliefs, by learning mental properties through experience over time, to achieve mutual consonant beliefs among the first group of agents and the second group of agents, using the learning algorithm; and instructions causing generating, by the computer processor, a proposal result predicting alliance formation among the first group of agents and the second group of agents.

14. The computer readable medium according to claim 13, wherein predicting alliance formation among groups of people is based on determining beliefs of a plurality of agents.

15. The computer readable medium according to claim 13, wherein the plurality of agents includes cognitive agents.

16. The computer readable medium according to claim 13, wherein one or more agents of the first group of agents and the second group of agents represent partner preferences.

17. The computer readable medium according to claim 13, wherein the plurality of fuzzy cognitive maps represent belief assertions.

* * * * *